Feb. 11, 1936.  H. D. SMITH  2,030,188
MAGNETIC CAPPING CHUCK
Filed Dec. 8, 1934
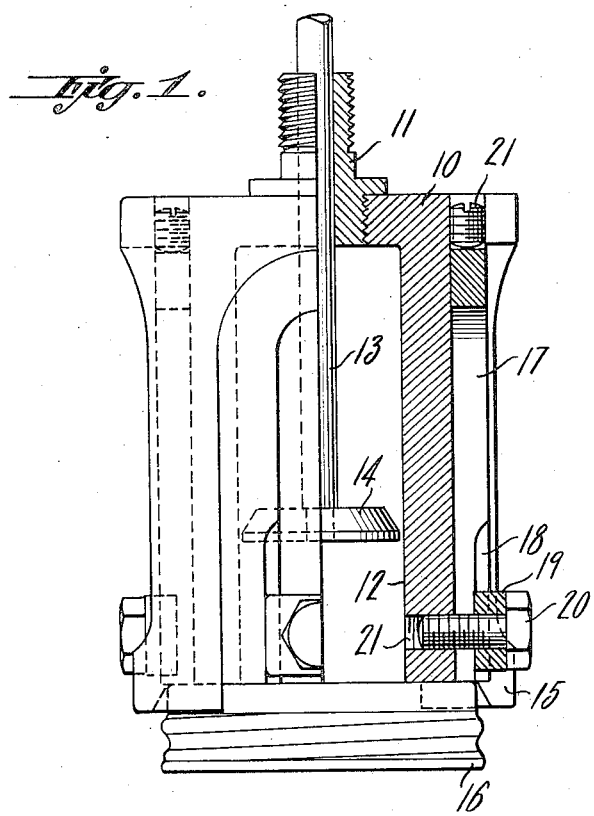
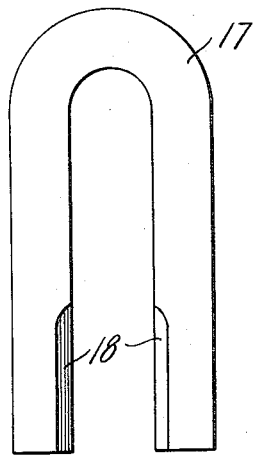
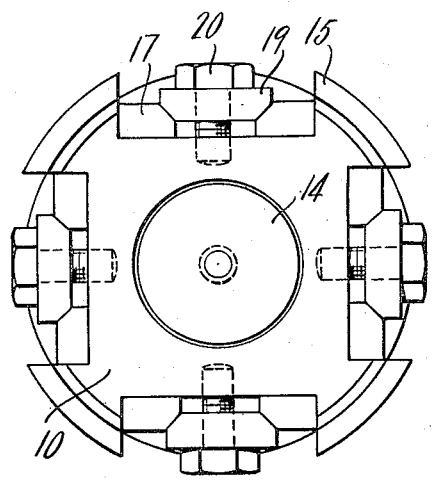
INVENTOR
HARRY D. SMITH
BY
ATTORNEY Patented Feb. 11, 1936

2,030,188

UNITED STATES PATENT OFFICE 2,030,188

MAGNETIC CAPPING CHUCK

Harry D. Smith, Buffalo, N. Y., assignor to Consolidated Packaging Machinery Corporation, a corporation of New York Application December 8, 1934, Serial No. 756,578

3 Claims. (Cl. 226—88)

My present invention relates to a magnetic capping chuck adapted to be employed in a container capping machine, such as disclosed in United States Patent 1,773,960, issued to Robert N. Cundall, dated August 26, 1930. This chuck may be employed with almost any type of capping machine and the aforementioned patent merely shows one type of machine to which it may be readily attached.

My invention is of such a nature that it adapts itself readily to the capping of large containers in vacuum, although that use is by no means the only purpose for which this chuck is suitable, as will be apparent.

The primary object of my invention is to devise a chuck which will more or less lightly hold a threaded metallic cap and rotate the same to some extent, partially but not firmly onto the threaded neck of the container.

A second object of my invention is to devise a chuck which will more or less lightly hold a smooth metallic cap of a type which is slipped upon the open end of a container, being held there by friction rather than by screw threads.

A further object of my invention is to devise a chuck which may be readily adjusted to accommodate variations in the size and contour of the metallic caps.

Other objects and advantages of my invention will be apparent from the following description taken in connection with the accompanying drawing, wherein like numerals refer to like parts throughout.

Referring to the drawing:

Fig. 1 is a view in elevation of the chuck in the act of gripping a cap, one side of the chuck being broken away along a median line to clarify details thereof;

Fig. 2 is a bottom view of the chuck; and

Fig. 3 is a view in elevation of an element of the chuck.

My chuck comprises a body 10 consisting of an integral cup-shaped member to the top of which is threaded a coupling 11 by means of which the chuck may be fastened, to the usual rotary spindle if the cap is of the threaded type, or to a non-rotating spindle if the cap is of the smooth type. The coupling 11 has a central bore through which may slide a plunger 13 having an enlarged ejecting head 14 thereon guided in the cavity 12 of the member 10. The member 10 is formed with a plurality of magnet seats, preferably four, leaving spaced guiding portions 15 around the lower circumference of the body. The guiding portions 15 project below the major portion of the member 10 and are preferably inwardly beveled in order that the cap 16 will be centered in the chuck. Each of the seats formed in the member 10 is so shaped as to hold an inserted horseshoe magnet 17. Other shapes of magnets, such as bar magnets, may of course be used but the horseshoe type readily lends itself to this construction. The adjacent edges of the legs of the magnets are beveled as at 18 and a wedge 19 tightened by a bolt 20 threaded into openings 21 in the body 10 holds the magnet firmly in place. The top of each of the arched portions of each magnet is engaged by the lower end of a set screw 21 threaded into the top flange of the member 10.

The cap is centered in the chuck by the depending flanges of the guiding portions 15 and leveled therein by resting upon the lower ends of the magnets 17. By loosening the bolts 20, and the set screws 21, and adjusting the position of the magnets, a truer seating can be obtained. Likewise, the magnets can be so adjusted as to cant the cap to a greater or lesser extent which will sometimes assist in screwing the cap onto the container.

Likewise, a greater or lesser vertical adjustment of the magnet 17 will increase or decrease the effective diameter of the space between the beveled guiding portions 15, so that caps of varying diameters will be accurately centered.

As explained in the aforementioned patent the rod 13 with the ejector 14 is adapted to eject the cap from the chuck upon relative movement of the ejecting head and the chuck, thus preventing the occurrence of accidents.

My chuck is peculiarly adapted to the capping of threaded containers in vacuum since it does not grip the cap very tightly and the friction of the threads of the cap and container will prevent the application of the cap to the container to such an extent that air cannot escape from the container. It is the usual practice in vacuum packing partially to cap the container before the air is exhausted in order that the air may be exhausted without disrupting the commodity being packaged. After suction is applied to exhaust the air the cap is firmly seated to provide and maintain an air-tight seal. My present invention is designed primarily to initially cap the container before suction is applied, the relatively loose grip of the chuck preventing the formation of an air-tight seal before the air is exhausted.

In practice my chuck may be so associated with the machine that the ejecting head 14 will detach the chuck from the cap after it is applied to the container and before or during the time that the air is being exhausted from the container. Thereafter, by other suitable means, the cap will be screwed down to a firm seat. An alternative manner of using my chuck is made possible by the construction of the capping machine set forth in the aforementioned patent. In this manner of use, during the initial application of the cap the chuck is not forcibly depressed, since it merely rests upon the container. After the initial capping and after the air has been exhausted from the container the chuck may be given a positive downward pressure so that the cap will be firmly seated. To assist in gripping the cap while it is being given the final rotation, the inner surfaces of the guiding portions 15 and the lower surfaces of the member 10 and magnets 17 may be roughened or knurled.

Numerous alterations in appearance and arrangement will suggest themselves to a skilled mechanic and I do not intend to be limited to the exact details set forth herewith. The scope of my invention is to be determined by the following claims.

I claim:

1. A capping chuck comprising a body and a plurality of magnets carried by said body, said magnets being seated upon the outer surface of said body, each of said magnets being vertically adjustable with relation to said body.

2. A capping chuck comprising a body, a plurality of magnets carried by said body, said magnets being seated upon the outer surface of said body, and depending guide portions on said body between said magnets.

3. A capping chuck comprising a body, a plurality of magnets carried by said body, said magnets being seated upon the outer surface of said body, and depending guide portions on said body between said magnets, said guide portions being inwardly bevelled and extending below the end of said body.

H. D. SMITH.